(12) United States Patent
Rose et al.

(10) Patent No.: US 10,610,992 B2
(45) Date of Patent: Apr. 7, 2020

(54) AUTOMATED INTERCHANGEABLE COOLANT DISTRIBUTOR

(71) Applicant: United Technologies Corporation, Farmington, CT (US)

(72) Inventors: Colin F. Rose, Worcester, MA (US); Gordon M. Reed, Plantsville, CT (US); Jonathon A. Morley, Manchester, CT (US)

(73) Assignee: United Technologies Corporation, Farmington, CT (US)

(*) Notice: Subject to any disclaimer, the term of this patent is extended or adjusted under 35 U.S.C. 154(b) by 0 days.

(21) Appl. No.: 15/688,321

(22) Filed: Aug. 28, 2017

(65) Prior Publication Data

US 2019/0061082 A1 Feb. 28, 2019

(51) Int. Cl.
*B23Q 11/10* (2006.01)
*B23Q 11/14* (2006.01)

(52) U.S. Cl.
CPC ........ *B23Q 11/1076* (2013.01); *B23Q 11/141* (2013.01); *B23Q 11/146* (2013.01); *B23Q 11/1084* (2013.01); *Y10T 408/458* (2015.01); *Y10T 408/46* (2015.01); *Y10T 409/303976* (2015.01)

(58) Field of Classification Search
CPC . B23Q 11/1076; B23Q 11/10; B23Q 11/1084; Y10T 408/46; Y10T 408/458
See application file for complete search history.

(56) References Cited

U.S. PATENT DOCUMENTS

| 2,653,517 | A | * | 9/1953 | Pigott | B24B 55/02 239/126 |
| 2,929,566 | A | * | 3/1960 | Paasche | B23Q 11/1084 239/273 |
| 3,726,363 | A | * | 4/1973 | Sussman | B23Q 11/103 184/39.1 |
| 3,868,195 | A | * | 2/1975 | Anderson | B23Q 11/1076 184/6.26 |
| 3,893,355 | A | | 7/1975 | Maastricht | |
| 4,778,315 | A | * | 10/1988 | Duffy | B23Q 11/005 29/DIG. 78 |

(Continued)

FOREIGN PATENT DOCUMENTS

| DE | 29900753 U1 | 4/1999 | |
| DE | 102012018389 A1 | * 3/2014 | ......... B23Q 11/1076 |

OTHER PUBLICATIONS

European Search Report dated Jan. 30, 2019 for corresponding European Patent Application No. 18191323.7.

*Primary Examiner* — Alan Snyder
*Assistant Examiner* — Yasir A Diab
(74) *Attorney, Agent, or Firm* — Bachman & LaPointe, P.C.

(57) ABSTRACT

A coolant distributor comprising a head having a plurality of ports, each of the ports being fluidly coupled to a flow control valve. A cap is demountably coupled to the head. The cap comprises at least one fixed nozzle fluidly coupled to at least one port. A controller is coupled to the flow control valve, wherein the controller is configured to actuate the flow control valve to pass a cooling fluid through the at least one fixed nozzle to direct the cooling fluid to at least one predetermined cutting region of a machine tool and work piece proximate the coolant distributor.

8 Claims, 3 Drawing Sheets

(56) References Cited

U.S. PATENT DOCUMENTS

| | | | | |
|---|---|---|---|---|
| 5,190,421 | A | * | 3/1993 | Wen ................. B23Q 11/10 184/6.14 |
| 5,245,152 | A | * | 9/1993 | McCall ............... B23H 1/08 219/69.14 |
| 5,265,505 | A | * | 11/1993 | Frechette ........... B23Q 1/0018 29/39 |
| 5,297,657 | A | * | 3/1994 | McConkey ........ B23Q 11/1076 184/27.1 |
| 5,313,743 | A | | 5/1994 | Peschik |
| 5,349,731 | A | * | 9/1994 | Sheehan .............. B23Q 5/404 29/27 R |
| 5,993,121 | A | * | 11/1999 | Fiesta ............... B23Q 11/1076 408/56 |
| 6,241,432 | B1 | | 6/2001 | Sasanecki |
| 7,537,422 | B2 | | 5/2009 | Ballas et al. |
| 7,727,054 | B2 | | 6/2010 | Webster |
| 7,878,096 | B2 | | 2/2011 | Banks |
| 8,529,312 | B2 | | 9/2013 | Kritzky et al. |
| 9,033,626 | B2 | | 5/2015 | Leishman et al. |
| 9,238,287 | B2 | | 1/2016 | Gardner et al. |
| 2005/0009454 | A1 | | 1/2005 | Mundt |
| 2014/0286720 | A1 | * | 9/2014 | Leishman ............ B23Q 11/10 409/131 |
| 2015/0151397 | A1 | * | 6/2015 | Wolgram ............ B24B 55/03 137/798 |

\* cited by examiner

AUTOMATED INTERCHANGEABLE COOLANT DISTRIBUTOR

BACKGROUND

The present disclosure is related to machine cutting fluid or coolant systems. More specifically, the disclosure relates to an interchangeable nozzle assembly with a variety of fixed spray nozzles for a cutting machine coolant distributor.

Milling and grinding machines need to have coolant directed to specific areas during cutting. Cutting fluid, or coolant, is liquid used to cool and lubricate the cutting edges of machine tools and the pieces they are shaping. It is pumped over the cutting site of machines such as lathes, milling machines, shapers, grinders and saws.

Metal cutting operations generate heat due to friction between a tool and a workpiece. The heat generated is from energy lost deforming the material and needs to be carried away. Water is a conductor of heat but is not stable at high temperatures, so stability is often achieved by making an emulsion of water with oil. The goal is to keep the workpiece at a stable temperature and maximize the life of the cutting tool by lubricating its working edge to reduce tip welding.

To ensure cutting edge cooling, the coolant stream must be aimed at the point where the cutting tool is removing metal. Manual systems require machine operators to constantly adjust the coolant systems to make sure coolant is aimed in the right position to flood the work zone. While coolant lines and nozzles are easy to adjust, having to make adjustments every time a tool change takes place is inefficient. It is also dangerous if an operator reaches into a machine with its spindle turning.

The benefits of keeping coolant on target make substantial contributions to productivity. It minimizes the risk of damaging heat build-up in the workpiece or cutting tool thereby preserving tool life. It allows optimal feed rates and speeds to be applied more safely and flushes away swarfs and chips.

What is desired is an apparatus that can be applied to an existing milling or grinding machine that targets coolant to a best location on a cutting tool in response to a machine program and allows machine operators to leave a machine untended for extended periods.

SUMMARY

In accordance with the present disclosure, there is provided a coolant distributor comprising a head having a plurality of ports, each of the ports being fluidly coupled to a flow control valve; a cap demountably coupled to the head, the cap comprising at least one fixed nozzle fluidly coupled to at least one port; a controller coupled to the flow control valve, wherein the controller is configured to actuate the flow control valve to pass a cooling fluid through the at least one fixed nozzle to direct the cooling fluid to at least one predetermined cutting region of a machine tool and work piece proximate the coolant distributor.

In another and alternative embodiment, each of the at least one fixed nozzle is configured to direct the cooling fluid to a particular one of the at least one predetermined cutting region.

In another and alternative embodiment, the at least one predetermined cutting region corresponds to a location for the application of the cooling fluid to control a temperature and a lubrication level of the machine tool and the work piece for removal of material.

In another and alternative embodiment, the at least one predetermined cutting region varies responsive to the type of machine tool and work piece and responsive to changes in a shape of the machine tool and a shape of the work piece.

In another and alternative embodiment, the head is configured to receive a variety of caps, each the cap being configured for at least one predetermined machine tool and work piece.

In another and alternative embodiment, the controller includes data comprising coordinates of the at least one predetermined cutting region corresponding to the machine tool and the work piece.

In another and alternative embodiment, the flow control valve is fluidly coupled to more than one fixed nozzle.

In accordance with the present disclosure, there is provided a coolant distributor for a machine tool comprising a head having ports fluidly coupled to a cooling fluid reservoir; a flow control valve fluidly coupled to the ports and the cooling fluid reservoir; a controller coupled to the flow control valve; a cap attached to the head, the cap comprising at least one fixed nozzle, the at least one fixed nozzle fluidly coupled to at least one of the ports, the fixed nozzle configured to direct the cooling fluid to a predetermined cutting region of the machine tool and a work piece.

In another and alternative embodiment, the cap is interchangeable with additional caps having different fixed nozzle configurations corresponding to a predetermined cutting region.

In another and alternative embodiment, the fixed nozzles direct the cooling fluid to the predetermined cutting region in the absence of adjustment.

In another and alternative embodiment, the controller is coupled to a computer numerical control apparatus.

In another and alternative embodiment, the cutting region is a location requiring application of the cooling fluid for control of a temperature and a lubrication of the machine tool and the work piece.

In another and alternative embodiment, the controller is configured to selectively actuate the flow control valve to flow the cooling fluid through a particular nozzle configured to direct the cooling fluid to the predetermined cutting region responsive to the machine tool and the work piece.

In accordance with the present disclosure, there is provided a process for lubricating and cooling a machine tool and a work piece during a variety of machining operations comprising selectively flowing a cooling fluid through a first fixed nozzle to a first predetermined cutting region responsive to a controller; and selectively flowing a cooling fluid through a second fixed nozzle to a second predetermined cutting region responsive to the controller.

In another and alternative embodiment, the process further comprises fluidly coupling a cooling fluid reservoir to the first fixed nozzle through a first flow control valve; and fluidly coupling the cooling fluid reservoir to the second fixed nozzle through a second flow control valve.

In another and alternative embodiment, the first flow control valve is fluidly coupled to a first port formed in a head; the second flow control valve is fluidly coupled to a second port formed in the head; the first fixed nozzle and the second fixed nozzle being coupled to a first cap attached to the head.

In another and alternative embodiment, the process further comprises changing the first cap for second cap having a third fixed nozzle configured to direct the cooling fluid to a third predetermined cutting region.

In another and alternative embodiment, the process further comprises matching the first predetermined cutting region and the second predetermined cutting region to the machine tool and the work piece responsive to the changes in shape and size of the machine tool and the work piece.

In another and alternative embodiment, the first fixed nozzle and the second fixed nozzle are preset with the absence of adjustment during operation.

Other details of the coolant distributor are set forth in the following detailed description and the accompanying drawings wherein like reference numerals depict like elements.

DETAILED DESCRIPTION

Figure 1:
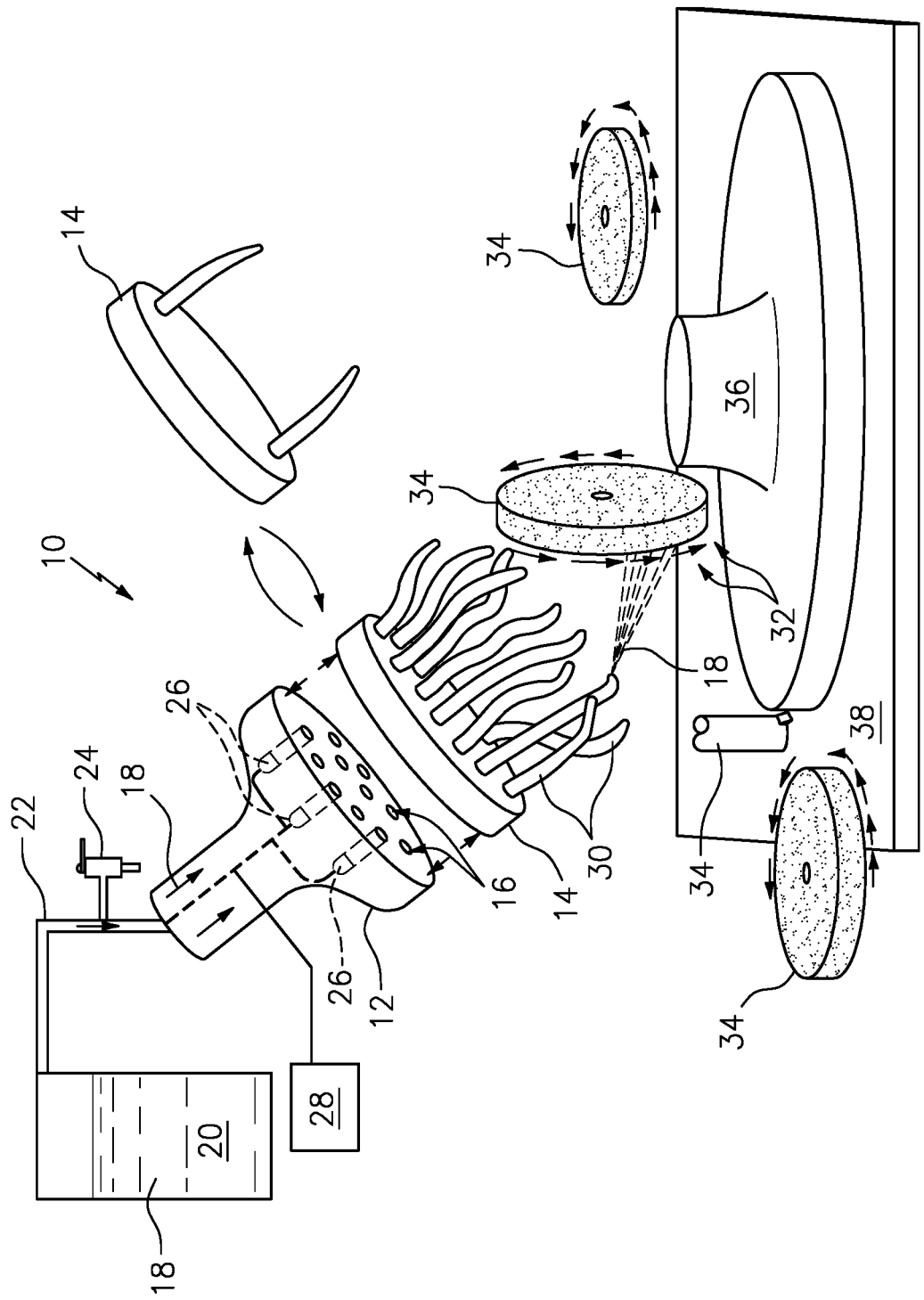
FIG. 1 is a schematic representation of an exemplary coolant distributor with a machining tool.

Referring now to FIG. 1, there is illustrated an exemplary coolant distributor 10. The coolant distributor 10 comprises a head 12 and a cap 14. The cap 14 is demountably attached to the head 12. The head 12 includes a plurality of ports 16 formed in the head 12. The ports 16 are configured to selectively couple a cooling fluid 18 to the cap 14. The cooling fluid 18 is designed to both cool and lubricate. A cooling fluid reservoir 20 is fluidly coupled to the head 12 through cooling fluid tube 22. A pressure relief valve 24 is coupled to the cooling fluid tube 22 and configured to release the cooling fluid 18 at a predetermined pressure to protect the cooling fluid tube 22, and other fluid components in the coolant distributor 10.

A flow control valve 26 is fluidly coupled to each port 16 in the head 12. In an exemplary embodiment, there is a flow control valve 26 for each port 16. In another exemplary embodiment, there can be a flow control valve 26 for a predetermined number of ports 16. The flow control valve 26 is coupled to and selectively actuated by a controller 28. In an exemplary embodiment, the controller 28 can be part of the computer numerical control (CNC) apparatus that enables the machining process. In an exemplary embodiment, the flow control valve 26 can be a solenoid valve, pneumatic valve and the like.

The cap 14 includes a plurality of nozzles 30. The nozzles 30 are fixed nozzles and configured to direct the cooling fluid 18 at a cutting region 32. The fixed nozzles 30 are not adjusted by a machine operator. The fixed nozzles 30 are preset and configured to direct the cooling fluid 18 to the proper cutting region 32 without the need for a machine operator's manipulation. The cutting region 32 is the location where a machine tool 34 contacts a work piece 36 on a table 38 during the machining process. The cutting region 32 is the location that requires the application of the cooling fluid 18 to control the temperature and lubrication of the machine tool 34 and work piece 36 for material removal.

The cap 14 has multiple fixed nozzles 30 configured to direct the cooling fluid 18 to a specific predetermined cutting region 32 depending on the type of machine tool 34 and work piece 36 selected. As the machine tool 34 changes shape and size dimensions as well as the work piece changes shape and size dimensions the location of the cutting region 32 changes. Thus, each of the fixed nozzles 30 are configured to direct the cooling fluid 18 to a particular predetermined cutting region 32. The controller 28 opens the particular flow control valve 26 to flow cooling fluid 18 through a particular port 16 to a particular nozzle 30 for directing the cooling fluid 18 for a particular cutting region 32 responsive to the anticipated location of the predetermined cutting region 32.

In an exemplary embodiment, there can be multiple caps 14 that are interchangeable for attaching to the head 12. The head 12 can be configured as a universal head that accepts a variety of caps 14. The caps 14 can be configured with nozzles specific to the machining process and work piece 36 being machined. The caps 14 can be interchanged as needed depending upon the work piece 36 and machining process. A cap 14 can be configured to function with one or more predetermined machining process and/or work piece. Each cap 14 can accommodate many machine tools 34.

The control valves 26 in the ports 16 in the head 12 are each controlled to flow cooling fluid 18 to a particular nozzle 30 in the cap 14. The controller 28 has databases that include the predetermined coordinates of each cutting region 32.

The machine tool 34 can include a grinding wheel, a drill, a cutting edge, a turning insert, a milling tool, and the like.

Figure 2:
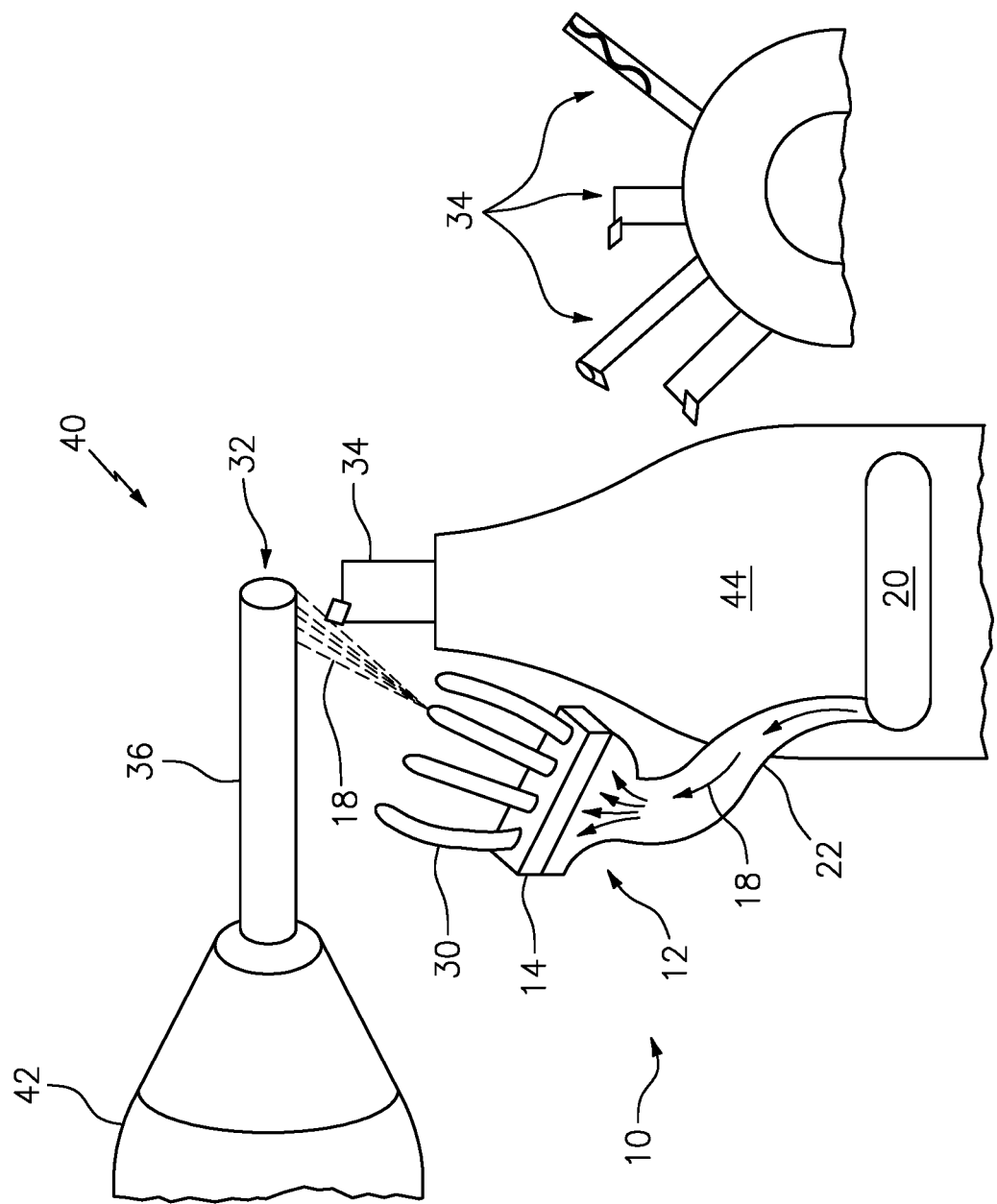
FIG. 2 is a schematic representation of an exemplary coolant distributor with a lathe.

Referring to FIG. 2 an exemplary coolant distributor 10 is illustrated with a lathe 40. The lathe 40 with chuck 42 holding the work piece 36 turns the work piece 36 as the machine tool 34 mounted in the tool post 44 cuts the work piece 36. In an exemplary embodiment, the coolant distributor 10 can be mounted to the tool post 44. Multiple machine tool 34 configurations can be assembled in a tool magazine 46. The cap 14 can include a nozzle 30 configuration that enables multiple machine tools 34 resulting in multiple cutting regions 32 without the need to adjust the fixed nozzles 30 of the coolant distributor 10. The coolant distributor 10 has a flexible configuration that allows for placement of the coolant distributor 10 in multiple locations for optimal coolant fluid 18 application.

Figure 3:
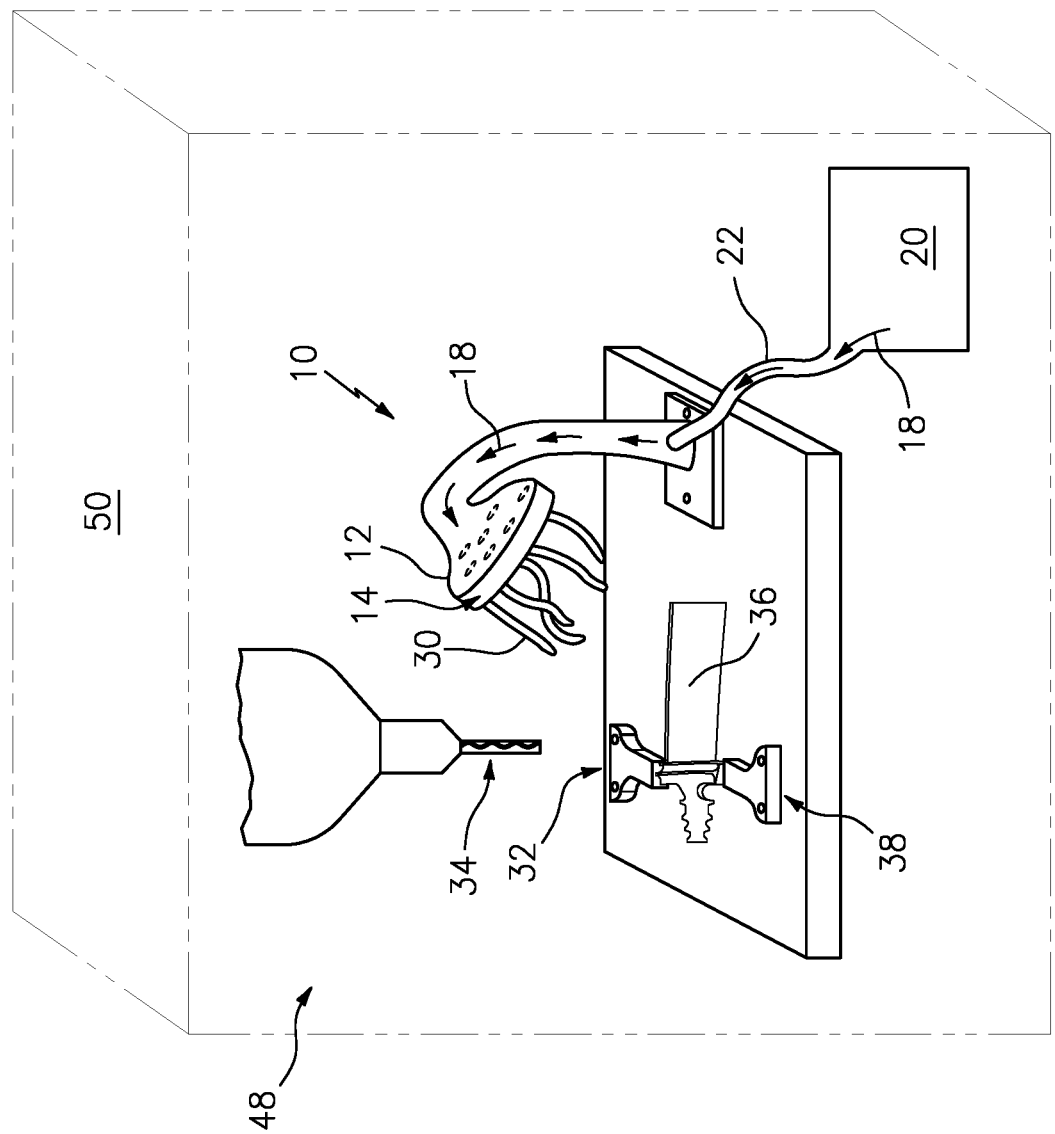
FIG. 3 is a schematic representation of an exemplary coolant distributor with a milling machine.

FIG. 3 illustrates another exemplary embodiment with the coolant distributor 10 coupled with a milling machine 48. The coolant distributor 10 is attached to the machine table 38 inside the milling machine cabinet 50. The coolant distributor 10 can be located for optimal delivery of the cooling fluid 18 to the cutting region 32.

The disclosed coolant distributor allows for coolant delivery into the cutting zone without manual adjustment of the fixed nozzles of the coolant distributor.

The disclosed coolant distributor eliminates the cycle time required for changing coolant nozzles for different parts and/or machining tools.

The disclosed coolant distributor can be mounted in a variety of locations near the machining operation enabling coolant delivery to the cutting region consistently.

The disclosed coolant distributor can be integrated into both a turret head a machine table or a fixed point within the machine.

The disclosed coolant distributor includes a cap that houses all of the nozzles required for a particular machine and part as well as a selection of a variety of caps each with varying fixed nozzle geometries configured for predetermined cooling fluid distribution.

The disclosed coolant distributor allows for the flow of cooling fluid to a variety of cutting regions for a variety of machine tools and work pieces before a cooling fluid nozzle adjustment is needed.

There has been provided a coolant distributor. While the coolant distributor has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A coolant distributor comprising:
    a head having a plurality of ports, each of said ports being fluidly coupled to a flow control valve;
    a cap demountably coupled to said head, said cap comprising at least one fixed nozzle fluidly coupled to at least one port; wherein said head is configured to receive a variety of caps, each said cap being configured for at least one predetermined machine tool and work piece;
    a controller coupled to said flow control valve, wherein said controller is configured to actuate said flow control valve to pass a cooling fluid through said at least one fixed nozzle to direct said cooling fluid to at least one predetermined cutting region of a machine tool and work piece proximate the coolant distributor; wherein said at least one predetermined cutting region corresponds to a location for the application of said cooling fluid to control a temperature and a lubrication level of said machine tool and said work piece for removal of material; wherein said at least one predetermined cutting region varies responsive to the type of machine tool and work piece and responsive to changes in a shape of said machine tool and a shape of said work piece.

2. The coolant distributor according to claim 1, wherein each of said at least one fixed nozzle is configured to direct said cooling fluid to a particular one of said at least one predetermined cutting region.

3. The coolant distributor according to claim 1, wherein said controller includes data comprising coordinates of said at least one predetermined cutting region corresponding to said machine tool and said work piece.

4. The coolant distributor according to claim 1, wherein said flow control valve is fluidly coupled to more than one fixed nozzle.

5. A coolant distributor for a machine tool comprising:
    a head having ports fluidly coupled to a cooling fluid reservoir;
    a flow control valve fluidly coupled to said ports and said cooling fluid reservoir;
    a controller coupled to said flow control valve;
    a cap attached to said head, said cap comprising at least one fixed nozzle, said at least one fixed nozzle fluidly coupled to at least one of said ports, said fixed nozzle configured to direct said cooling fluid to a predetermined cutting region of said machine tool and a work piece; wherein said fixed nozzle is configured to direct said cooling fluid to said predetermined cutting region in the absence of adjustment; wherein said cap is interchangeable with additional caps having different fixed nozzle configurations corresponding to a predetermined cutting region; wherein said controller is configured to selectively actuate said flow control valve to flow said cooling fluid through a particular nozzle configured to direct said cooling fluid to said predetermined cutting region responsive to said machine tool and said work piece.

6. The coolant distributor according to claim 5, wherein said controller is coupled to a computer numerical control apparatus.

7. The coolant distributor according to claim 5, wherein said cutting region is a location requiring application of said cooling fluid for control of a temperature and a lubrication of said machine tool and said work piece.

8. A process for lubricating and cooling a machine tool and a work piece during a variety of machining operations comprising:
    selectively flowing a cooling fluid through a first fixed nozzle to a first predetermined cutting region responsive to a controller;
    fluidly coupling a cooling fluid reservoir to said first fixed nozzle through a first flow control valve;
    selectively flowing a cooling fluid through a second fixed nozzle to a second predetermined cutting region responsive to said controller; fluidly coupling said cooling fluid reservoir to said second fixed nozzle through a second flow control valve; wherein said first flow control valve is fluidly coupled to a first port formed in a head; said second flow control valve is fluidly coupled to a second port formed in said head; said first fixed nozzle and said second fixed nozzle being coupled to a first cap attached to said head; wherein said first fixed nozzle and said second fixed nozzle are preset with the absence of adjustment during operation; matching said first predetermined cutting region and said second predetermined cutting region to the machine tool and the work piece responsive to the changes in shape and size of the machine tool and the work piece; and
    changing said first cap for second cap having a third fixed nozzle configured to direct said cooling fluid to a third predetermined cutting region.

* * * * *